United States Patent [19]

Nagler

[11] 3,952,307

[45] Apr. 20, 1976

[54] DEACTIVATING RADAR CHAFF

[75] Inventor: Robert T. Nagler, Prairie du Sac, Wis.

[73] Assignee: The United States of America as represented by the Secretary of the Air Force, Washington, D.C.

[22] Filed: June 18, 1963

[21] Appl. No.: 289,784

[52] U.S. Cl. .................... 343/18 B; 343/18 E

[51] Int. Cl.$^2$ .................... G01S 7/38

[58] Field of Search .................... 96/35, 49, 75, 91; 101/401.1; 343/18, 18 B, 18 E

[56] References Cited

UNITED STATES PATENTS

| | | | |
|---|---|---|---|
| 2,125,509 | 4/1937 | Lecher | 96/91 |
| 2,714,066 | 7/1955 | Jewett | 96/33 |
| 3,725,927 | 4/1973 | Fiedler | 343/18 E |

*Primary Examiner*—T. H. Tubbesing
*Attorney, Agent, or Firm*—Joseph E. Rusz; Louis S. Hay

EXEMPLARY CLAIM

1. Deactivating radar chaff which becomes electrically inactive upon exposure to ultraviolet light and comprising: an electrically inert central element, a metallic layer on said central element, a sodium silicate layer on said metallic layer, and a layer containing a fluoride diazo compound on said sodium silicate layer.

2 Claims, 2 Drawing Figures

Figure 1:
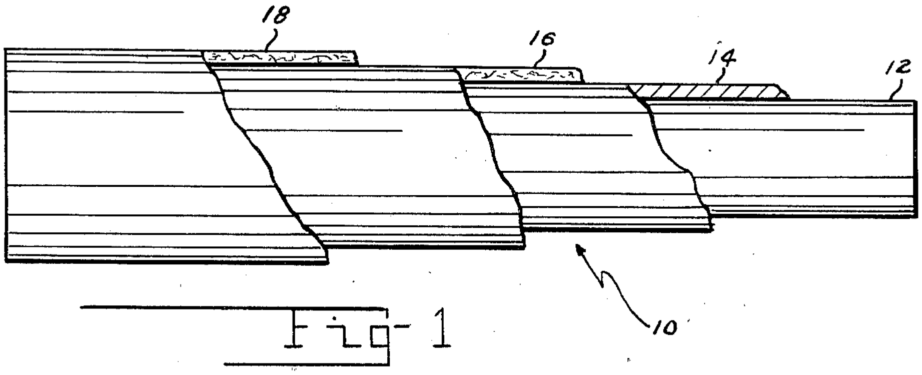

INVENTOR.
ROBERT T. NAGLER
BY Wade Koontz and Louis E. T. Sly
ATTORNEYS

DEACTIVATING RADAR CHAFF

This invention relates to articles having a controllable corrosion rate and, more specifically, to the utilization of a specific class of chemical compounds to produce the deactivation of such an article in the form of radar chaff, or to cause the etching of photoengraving plates.

Deactivating radar chaff as contemplated by this invention may take numerous forms. Such chaff may be in the form of thin metal sheets, foils or films; either alone or in the form of a metallic coating on a nonmetallic substrate. In addition to metallic strips or foils, the chaff may be strips of metallized plastic films, or metal coated organic fibers, threads or yarns. Operative requirements for the invention are: (1) the metal of the chaff material must be sufficiently thin to be effectively destroyed by the chemical products released by the class of chemical compounds used, and (2) the nature of the chaff material must be suitable for application of silicate and azo-compound coatings. It has been found that a metallic thickness range up to 15 microns (roughly 0.0005 inch) is satisfactory. For purposes of illustration only, and without intent of limitation, the radar chaff to be described and shown will be composed of filaments made of metallic coated glass fiber.

Radar chaff, regardless of form or composition, is often used to attack enemy radar systems and render them inefficient. Because of the chaff's conductivity, a dipole is set up within each filament of chaff which registers upon the radar screen to produce a false reading. In order for the chaff to appear as a moving object on the radar screen, it is necessary for the chaff to become deactivated after a predetermined period of time and thus foil detection by the radar apparatus. Chaff having this deactivating ability will appear on the radar screen as a moving object such as an airplane.

Another use for deactivating chaff is in testing. By using chaff which will become deactivated after a determined period, it is possible to test the chaff without disrupting the electrical systems on the ground for more than a predetermined period of time. In testing, if the chaff did not become deactivated, it would take a prolonged period of time for ground electrical installations in the test region to again function normally.

It has been found that by applying a coating of diazo fluoride compound to a sodium silicate coated filament chaff, the chaff will become sensitive to ultraviolet light. Thereafter, upon prolonged exposure to light, the chaff will be rendered nonconductive and incapable of transmitting reflections to the radar apparatus.

One object of the present invention is to produce a radar chaff which may be deactivated as a transmitting device by prolonged exposure to sunlight.

Another object of this invention is to provide a radar chaff which will loose its electrical conductivity after a predetermined period of time.

A further object of this invention is to provide a radar chaff whose reflective properties are sensitive to ultraviolet light.

Yet another object of this invention is to provide a process for producing radar chaff whose reflective properties become deactivated after a period of time.

A still further object of this invention is to provide a process for transforming a normally electrical inert material into reflective radar chaff having a limited reflective life.

Figure 2:
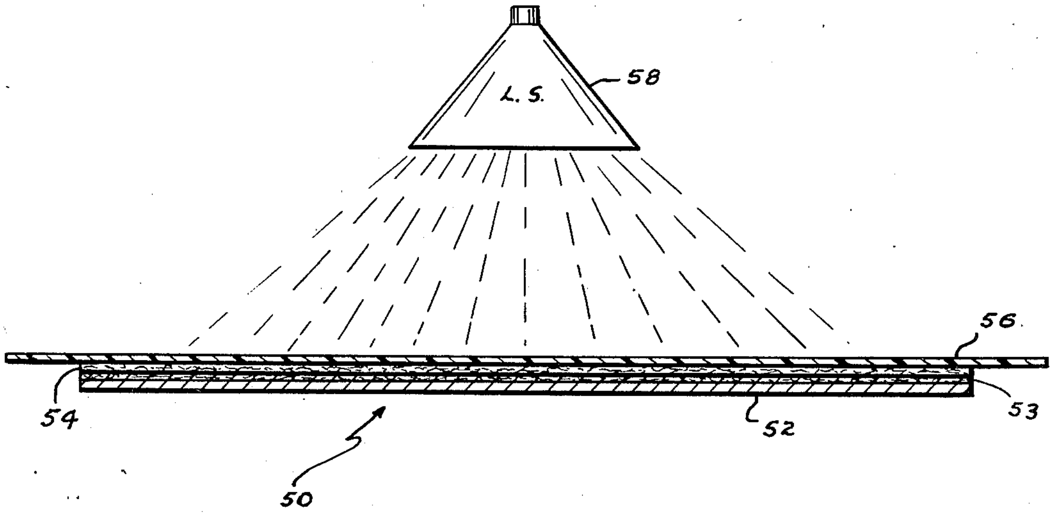

Additional objects, advantages and features of the invention reside in the construction, arrangement and combination of parts involved in the embodiments of the invention as will appear from the following description and accompanying drawings, wherein:

FIG. 1 is a typical filament of radar chaff made in accordance with the invention, and partially broken to show the several layers of material, and FIG. 2 is a schematic cross section of the various layers of material in a set-up used in making a photoengraving when subjected to a source of ultraviolet light.

Diazo compounds containing halogen atoms such as chlorine will destroy a metallic film; however, they will do so even in the absence of any ultraviolet radiation. The essence of this invention is that diazo compounds containing chlorine will not attack a silicate coating though they will attack metal; while diazo compounds containing fluorine will attack the silicate coating upon exposure to ultraviolet light. Therefore, the invention consists of applying a silicate coating over the metal, followed by a coating of diazo compound (s) containing fluorine and usually also chlorine. The silicate layer protects the metal in the absence of ultraviolet light. After irradiation, the hydrofluoric acid released by the fluorine containing compound destroys the silicate layer, thus allowing the hydrofluoric acid and/or the hydrochloric acid to destroy the metal thus exposed. Hydrofluoric acid will not effectively attack all the metals which may be used in connection with radar chaff; so, a mixture of fluorine and chlorine diazo compounds are often used. Diazo compounds of the other halogens, bromine and iodine, may be used on occasion.

Although the phenomena whereby the fluoride diazo compounds decompose at a controlled rate of time under ultraviolet light to produce nitrogen gas, hydrofluoric acid and an organic compound in a manner permitting varying the time delay of decomposition within certain limits is not fully understood; it is believed that the effects in general are attributable to the rate of decomposition of the fluoride diazo compounds under ultraviolet light allowing these compounds to liberate hydrofluoric acid at a controlled rate. For the purpose of producing a deactivating chaff affecting radar installations this is important, since the rate of disappearance of the chaff from detection by the radar may be controlled, so as to simulate the action of various objects in the sky.

Conventional radar chaff is often made from metallic coated glass fiber. The metallic coating which renders the chaff electrically reflective, may, for example, be aluminum, magnesium zinc, copper or other metals having good electrical characteristics. When such metallic coated glass fiber is coated with the aforementioned diazo compounds, in accordance with this invention, and exposed to ultraviolet light, hydrofluoric acid is released which destroys the sodium silicate layer and attacks the metallic coating underneath to thereby render the glass fiber inert to electricity. By controlling the thickness of the silicate layer and the quantity of fluorinated diazo compound, the rate of attack upon the metal coating may be varied to any desirable amount within certain limits.

The diazo compounds that are used may be represented by the formula $R-N=N-F$, where R is any aliphatic, aromatic or hetrocyclic organic radical. For example, R may be selected from methyl, benzyl, cyclohexenyl, ethyl, vinyl, and anthraquinone radicals.

The fluoride containing diazo compounds may be coated onto the sodium silicate coating on the metallic coated glass fiber as the outer coating by any conventional coating means not forming a part of this invention. If desired, the coating of diazo compounds may be incorporated in a plastic binder or other adherent vehicle. The range of possible compounds which could be used, depending upon conditions, is great. A simple example is benzene diazonium fluoride and/or benzene diazonium chloride or double salts of these compounds.

FIG. 1 is a graphic representation of one filament of deactivating radar chaff made in accordance with this invention. The deactivating radar chaff referred to generally as chaff 10 comprises an electrically inert central element or core such as a glass fiber filament 12, a metallic coating 14, a sodium silicate coating 16 and an outer coating 18 containing a fluoride diazo compound or fluoro- and chloro-diazo compounds as specified above.

Unless the deployed chaff cloud is under exposure to sufficient intensity of natural ultraviolet radiation from sunlight, irradiation from an artificial source is required to initiate the desired sequence of reactions. If the time factors and required intensity of duration of exposure cannot be achieved by exposure to a direct source of suitable ultraviolet radiation just prior to deployment, it is possible to initiate the reaction by the use of phosphorescent material which can be energized by a brief high intensity exposure to one of several forms of energy and which will then radiate sufficient ultraviolet energy of the proper wavelength to activate the photosensitive material.

As related to the photoengraving process, a metal sheet or plate on which the photoengraved image is to be developed is selected. This sheet or plate could be of aluminum, copper, or other suitable metal. Because of the corrosive effect of photosensitive diazo compounds upon bare metal, such compounds cannot be applied to the metal plate very far in advance of utilization. However, if the upper metal surface first receives a thin coating of a suitable silicate material, such as sodium silicate, this corrosive effect cannot take place.

Commonly used photosensitive diazo compounds which generate hydrochloric acid upon photographic exposure and development cannot be used with a silicate protective coating since the hydrochloric acid will not attack the silicate. If the proposed types of diazo compounds, which generate hydrofluoric rather than hydrochloric acid, are used, the hydrofluoric acid will first attack and remove the protective silicate layer and then chemically etch or engrave the metal surface thus exposed. In practice, a mixture of fluoro- and chlorocompounds might be used, for most effective attack on the protective coating and on the metal plate, respectively.

To produce a photoengraving from such a composite-coated plate, a suitable positive transparency (which might be a photographic film, a half-tone screen, or a black-line drawing on a translucent material) would be superimposed on the coated plate and the set-up so formed would then be exposed to ultraviolet illumination of suitable wavelength and intensity through the positive transparency. The photosensitive diazo compounds under those portions of the transparency which permit passage of the ultraviolet light would, in the presence of moisture, release an inorganic acid or mixture of acids which would first eat away the protective silicate layer and then corrode or etch a portion of the underlying metal plate; diazo compounds under opaque portions of the transparency would not so release acid. The product would then be a plate in which the portions of the surface corresponding to opaque parts of the transparency would be unetched and hence would be raised above those portions corresponding to translucent parts of the transparency. In the conventional printing process, the unetched areas of the plate surface would transfer ink to the paper, while ink in the etched areas would not be transferred.

The photoengraving process is illustrated by FIG. 2 in which the set-up 50 consists of a metal plate 52, the sodium silicate protective coating 53, the coating containing diazo compounds 54, and the transparency 56; the set-up so formed being exposed to a suitable source of ultraviolet light 58.

It is to be understood that the embodiments of the present invention as shown and described are to be regarded as illustrative only and that the invention is susceptible to variations, modifications and changes within the scope of the appended claims.

I claim:

1. Deactivating radar chaff which becomes electrically inactive upon exposure to ultraviolet light and comprising: an electrically inert central element, a metallic layer on said central element, a sodium silicate layer on said metallic layer, and a layer containing a fluoride diazo compound on said sodium silicate layer.

2. Deactivating radar chaff which becomes electrically inactive upon exposure to ultraviolet light and comprising: an electrically inert central element, a metallic layer on said central element, a sodium silicate layer on said metallic layer, and a layer containing a mixture of fluoro- and chloro-diazo compounds on said sodium silicate layer.

* * * * *